United States Patent
Van Rees et al.

(10) Patent No.: US 6,677,889 B2
(45) Date of Patent: Jan. 13, 2004

(54) AUTO-DOCKING SYSTEM

(75) Inventors: H. Barteld Van Rees, Needham, MA (US); Michael Joseph Delcheccolo, Westford, MA (US); Delbert Lippert, Cobden (CA); Mark E. Russell, Westford, MA (US); Walter Gordon Woodington, Lincoln, MA (US); Keith Wansley, Merrimack, NH (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/054,220

(22) Filed: Jan. 22, 2002

(65) Prior Publication Data

US 2003/0137445 A1 Jul. 24, 2003

(51) Int. Cl.⁷ .............................................. G01S 13/00
(52) U.S. Cl. ....................... 342/41; 342/23; 114/144 RE
(58) Field of Search ............................ 342/21, 23, 41, 342/46, 59, 107, 109, 125; 114/144 RE, 144 A; 340/958, 961, 984, 435, 436

(56) References Cited

U.S. PATENT DOCUMENTS

| | | | |
|---|---|---|---|
| 3,594,716 A | 7/1971 | Waterman | 340/3 D |
| 3,707,717 A | 12/1972 | Frielinghaus | 343/6 R |
| 3,754,247 A | 8/1973 | Hansford | 343/5 R |
| 3,772,693 A | 11/1973 | Allard et al. | 343/6.5 LC |
| 3,772,697 A | 11/1973 | Ross | 343/13 R |
| 4,063,240 A | * 12/1977 | Isbister et al. | 342/21 |
| 4,216,538 A | 8/1980 | Tomlinson et al. | 367/89 |
| 4,220,111 A | 9/1980 | Krautkremer et al. | |
| 4,747,359 A | 5/1988 | Ueno | |
| 4,893,127 A | 1/1990 | Clark et al. | |
| 5,274,378 A | 12/1993 | O'Connor | 342/23 |
| 5,432,515 A | 7/1995 | O'Conner | 342/23 |
| 5,490,075 A | * 2/1996 | Howard et al. | 701/226 |
| 5,497,157 A | 3/1996 | Gruener et al. | |
| 5,534,872 A | 7/1996 | Kita | |
| 5,719,567 A | 2/1998 | Norris | |
| 5,754,429 A | 5/1998 | Ishihara et al. | 364/443 |
| 5,872,547 A | 2/1999 | Martek | 343/815 |
| 5,995,070 A | 11/1999 | Kitada | |
| 6,181,302 B1 | 1/2001 | Lynde | 345/7 |
| 6,249,241 B1 | 6/2001 | Jordan et al. | |
| 6,273,771 B1 | * 8/2001 | Buckley et al. | 440/84 |
| 2003/0137445 A1 | * 7/2003 | Van Rees et al. | 342/41 |

FOREIGN PATENT DOCUMENTS

| | | |
|---|---|---|
| DE | 19813005 | 10/1999 |
| JP | 61022275 | 1/1986 |

OTHER PUBLICATIONS

PCT International Search Report (forms PCT/ISA/220 and PCT/ISA/210); PCT Applicaiton No. PCT/US02/32644, Filed on Oct. 11, 2002.

Leuchars John; "Close Docking Techniques for Large Vessels;" XP009009373; Tanker & Bulk Carrier; P.D. Jul. 1969; pp. 123–125.

Evans et al.; "Docking Techniques and Evaluation Trials of the Swimmer AUV: An Autonomous Deployment AUV for Workclass ROVs;" XP-002238537; MTS 0-933957-28-9; P.D. May 11, 2001; pp. 520–528.

* cited by examiner

Primary Examiner—John B. Sotomayor
(74) Attorney, Agent, or Firm—Daly, Crowley & Mofford, LLP

(57) ABSTRACT

An auto-docking system has been provided that can automatically dock a ship. The auto-docking system provides a close in radar system and a secondary propulsion system that is under control of a docking processor.

13 Claims, 2 Drawing Sheets

AUTO-DOCKING SYSTEM

CROSS REFERENCE TO RELATED APPLICATIONS

Not Applicable

STATEMENT REGARDING FEDERALLY SPONSORED RESEARCH

Not Applicable.

FIELD OF THE INVENTION

This invention relates generally to docking systems and more particularly to a system for automatic docking of ships.

BACKGROUND OF THE INVENTION

As is known in the art, conventional ships can have a primary propulsion system of two types. First, one or two propellers can be angularly fixed in a position parallel with the keel of the ship and a rudder can be associated with each of the propellers. Alternatively, one or two propellers may be angularly movable with regard to the keel of the ship and there may be no rudders. The term 'secondary propulsion system' is used herein to describe any other propulsion system on the ship. Secondary propulsion systems are known to one of ordinary skill in the art to provide manual control of thrust at angles to the keel of the ship for tight maneuvers. For example, bow and stern thrusters are known in the art.

As is also known, a ship may have various forms of marine navigational equipment. Exemplary marine navigational systems include global positioning systems (GPS), magnetic compasses, gyro-compasses, radar systems, wind speed indicator systems, water current sensor systems, and marine speed logs.

The radar antenna of a conventional marine radar system is mounted high on the ship to allow the radar system to display objects at the greatest possible range from the ship. As is known in the art, a conventional marine radar system emits a pulsed beam of radar energy from the radar antenna and receives echoes by the radar antenna as the radar energy reflects off of objects in the path of the radar beam. The time delay between the transmitted pulse and the returned echo is used by the radar system to predict the range to a reflecting object. Typically, the radar beam is mechanically turned or "swept" in the azimuthal direction and the azimuthal steering of the beam is used to predict the azimuthal angle to the object. The conventional radar beam is swept azimuthally by mechanically rotating the radar antenna.

The beam width of a conventional marine radar is relatively narrow in azimuth, approximately 5 degrees, and relatively wide in elevation, approximately twenty five degrees, so as to form a vertically oriented fan shape. As with any projected energy, the fan shaped beam spreads spherically from the antenna, causing the fan shaped beam to have an outer 'front' edge that is curved as if to lie on a sphere that has the radar antenna at its origin.

The fan shaped azimuthally rotated beam provides sufficient range prediction accuracy for objects that are relatively far from the radar antenna. Due in part to the curved wavefront of the fan shaped beam, the conventional marine radar system range prediction accuracy is greatest at long ranges and degrades at close-in distances. Essentially, for relatively short ranges, the conventional marine radar cannot distinguish range difference between a farther tall object and a nearer low object. Both the farther tall object and the short nearer object can produce echoes with the same time delay. Thus, the conventional radar beam is not well suited for close-in docking operations. Conventional marine radars have a minimum display range that is typically hundreds of feet and display resolutions of tens of feet. For ship docking, range accuracies and resolutions of less than plus or minus 1 foot would be desirable at ship to dock ranges within 25 feet.

As mentioned above, on some ships, the primary propulsion system and associated propeller are fixed to one axis along the keel, and the directional control is by way of a moveable rudder. In some cases there may be two propellers and two rudders. Regardless, directional control by way of the rudder is greatest when the ship is progressing rapidly through the water. Control by the rudder is developed by flow past the rudder and such flow becomes minimal when the speed of the ship through the water is low.

When docking, the speed of the ship is low and thus the directional control by the rudder is reduced. However, control by the rudder does not become zero at zero ship speed because the rudder is positioned to be in the flow of water created by the propeller.

For other primary propulsion systems, directional control is provided by a change of axial direction of the propeller. For example, an outboard motor is turned to provide propeller thrust at an angle to the keel that results in the desired ship direction. For these ships, directional control is somewhat maintained at low speed.

Both types of primary propulsion systems are conventionally mounted near the rear of the ship. Steering from points near the rear of the ship does not allow effective control of the ship in a direction perpendicular to the keel of the ship, the direction most advantageous for parallel docking. Thrust at an angle to the keel of the ship from a point or points near the rear substantially acts to rotate the ship. Control for docking, for example in the direction perpendicular to the keel, can only be approximated with the primary propulsion system by combinations of forward propulsions and reverse propulsions at angles off the keel axis. Each such fore or aft thrust produces a rotation of the ship, in alternating rotational directions. The control while docking is complex and ship pilots must have substantial experience to perform a docking using such a technique.

On some other ships, secondary propulsion systems have been used. Bow and stern thrusters are sometimes provided to yield more precise maneuvering of the ship. The secondary propulsion systems are often positioned to have thrust at or near to a direction which is perpendicular to the keel of the ship so as to provide thrust sideward to the long axis of the ship, a direction advantageous to docking.

Like the primary propulsion systems, during docking, the secondary propulsion systems known in the art are manually controlled by the operator of the ship. Like manual control of the primary propulsion system during docking, manual control of the secondary propulsion systems is also relatively difficult due in part to water current and wind that act to move the ship in any direction relative to the direction of docking. Control of the primary propulsion system in combination with the secondary system is often needed to control the ship during docking in two dimensions, along the keel and perpendicular to the keel.

It is well known in the art that docking error can result in damage to the ship and/or to the dock. As conditions become increasingly windy or where the water current is high, the likelihood of damage is greatest. The docking maneuver requires complex manual fore and aft thrust from the primary propulsion system or complex thrust control of the secondary propulsion system.

Conventional docking systems only provide display information to the operator of the ship. The information is provided to an operator of the ship so that the operator can manually control the ship's primary and/or secondary propulsion system to bring the ship to dock.

It would, therefore, be desirable to provide a system that automatically controls the vessel propulsion system and aids in docking a ship. It would also be desirable to provide a system which conveys accurate range data to an operator of a ship when the ship is in close proximity (e.g. 25 feet or less) to dock or a docking structure. It would be further desirable to provide a system which displays docking data to an operator of a ship.

SUMMARY OF THE INVENTION

In accordance with the present invention, a system for automatically docking a ship includes a secondary propulsion system coupled to the ship for automatic steering of the ship, a docking processor coupled to the secondary propulsion system to control thrust provided by the secondary propulsion system and one or more radar systems coupled to provide navigational information to the docking processor wherein the docking processor uses the navigational information provided by the radar systems to control the thrust.

With this particular arrangement, the auto-docking system of the present invention provides automatic control of a secondary propulsion system to more accurately and safely dock a ship. The auto-docking system utilizes conically shaped radar beams narrow in two dimensions that are electronically steered. The conical beams provide accurate close-in radar range data. With these characteristics, the auto-docking system of the present invention can dock a ship in difficult conditions, with wind and water current, without manual intervention. The likelihood of manual docking error and resulting damage are minimized.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the auto-docking system, some introductory concepts and terminology are explained. As used herein, the term "ship" is intended to pertain to any size of water born vessel. The term can apply to both power and sailing vessels. Also as used herein, the term "primary propulsion system" is used to describe a main propeller or propellers and a main rudder or rudders of a ship. Conventional ships typically have a primary propulsion system which may be categorized into one of two categories. In the first category, one or two propellers may be angularly fixed in a position parallel with the keel of the ship and a rudder may be associated with each of the propellers. In the second category, one or two propellers may be angularly movable with regard to the keel of the ship and there may be no rudders. A ship can have both a primary propulsion system and a "secondary" propulsion system. The secondary propulsion system typically includes any other propulsion system on the ship. Secondary propulsion systems are known to one of ordinary skill in the art to provide manual control of thrust at angles to the keel of the ship for tight maneuvers. The term "dock" is intended to describe any structure at which a ship may come to a stop.

Figure 1:
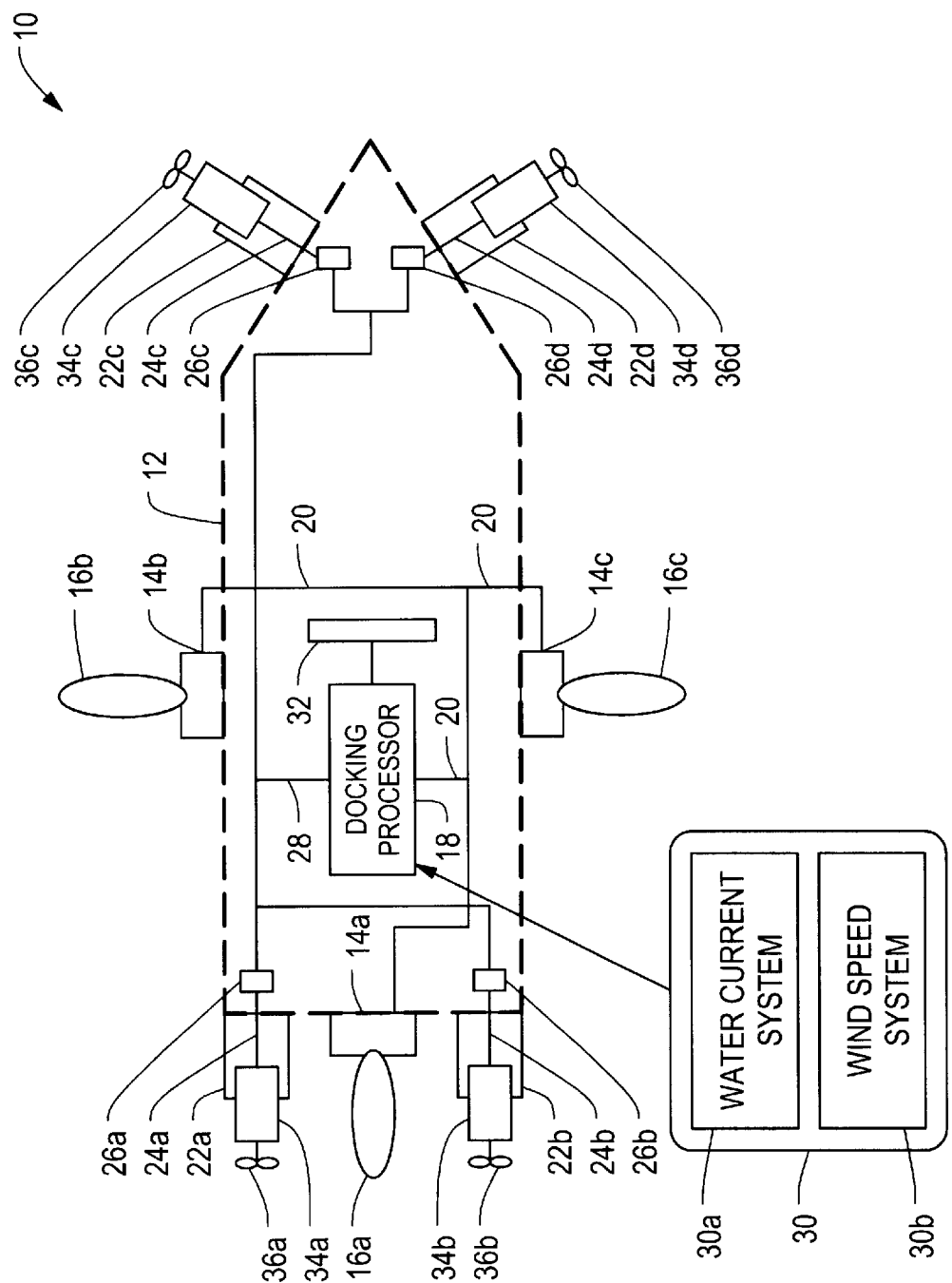
FIG. 1 is a block diagram of a ship having an auto-docking system disposed thereon.

Referring now to FIG. 1, a system 10 for automatic docking of a ship includes a plurality of short range radar systems 14a–14c, coupled to the ship 12. This ship 12 is shown in phantom since it is not properly a part of the system 10. Exemplary radar systems 14a–14c emit continuous wave (CW) radar energy.

The transmitted CW radar energy is repetitively swept in frequency from a minimum CW frequency to a maximum CW frequency and visa versa, thus providing an FMCW signal, and the return echo is simultaneously received. At any frequency, the time difference between the transmitted signal and the received signal of an echo represents the range between the radar antenna and the echoing object. Velocity information can also be obtained by extracting the Doppler shift from the frequency differences between the up sweep and down sweep. Thus, the short range radar systems 14a–14c can provide both range and velocity information.

The short range radar systems 14a–14c may be of a type, for example, described in U.S. patent application entitled Radar Transmitter Circuitry and Techniques, filed on Aug. 16, 2001, and assigned application Ser. No. 09/931,636, and U.S. patent application entitled Highly Integrated Single Substrate MMW Multi-Beam Sensor, filed on Aug. 16, 2001, and assigned application Ser. No. 09/931,277, each of which are assigned to the assignee of the present invention and incorporated herein by reference. It should be appreciated of course that other radar systems capable of providing suitable range accuracy and resolution can also be used in accordance with the present invention.

It will be recognized by one of ordinary skill in the art, that conventional pulsed radar systems discussed above can also be used with this invention. However, unlike the conventional marine radar system that has a radar antenna mounted high on the ship as described above, the radar antenna of this invention must be mounted low enough so as to transmit radar energy to and receive an echo from a dock. Also, the conventional pulsed energy marine radar system gives an indication only of range data and directly provides no velocity data. It will, however, be recognized by one of ordinary skill in the art that velocity data may be derived from successive range data, which is a slower process.

It will be further recognized by one of ordinary skill in the art that a conventional pulsed radar has limitations in the minimum range at which it can be used. In particular, a conventional pulsed radar in a short range application may not meet the FCC bandwidth requirements specified to be no greater than 200 MHz at a power level of 6 dB$_{eirp}$. In order to operate at the short ranges required of the short range radar systems 14a–14c, a pulsed radar would require a very short radar pulse. Not only is such a short pulse technically difficult to achieve, but also, as the pulse width becomes narrower, the bandwidth of the transmitted signal becomes wider. A pulsed radar with pulse widths sufficiently short to enable operation at a minimum range required of the short range radar systems 14a–14c, on the order of one foot minimum range, fundamentally requires a frequency bandwidth in excess of 200 MHz. In contrast, illustrative short range radar systems 14a–14c can generate an FMCW transmit signal having a frequency which increases from approximately 24.000 GHz to 24.200 GHz in approximately 1 ms, having a bandwidth of 200 MHz.

As is known to one of ordinary skill in the art, as radar energy radiates outward from an antenna, it spherically spreads, thus reducing in energy per area as it propagates. Whereas the short range radar systems 14a–14c only needs to operate over short ranges, for example one hundred feet maximum, the spherical spreading energy loss is far less than that of a conventional marine radar that typically transmits to receive echoes from objects many miles away from the antenna. Thus, the short range radar systems 14a–14c of this invention can operate at far lower output power levels than a convention marine radar system. An illustrative CW output power level of six decibels (6 dB) effective isotropic radiated power (6 $dB_{eirp}$) is appropriate for the auto-docking system. The illustrative short range radar system output power, generated with less than one Watt, can be compared to a conventional marine output power, generated with more than one thousand Watts.

In one illustrative embodiment, the short range radar systems 14a–14c are attached to the hull of the ship 12 approximately three feet above the water line. The height of the placement of the short range radar systems 14a–14c is determined by a number of factors, including but not limited to the height of the dock that is to be detected by the auto-docking system 10. It will be recognized by one of ordinary skill in the art that the short range radar systems 14a–14c can be mounted to other structures associated with the ship 12 other than the hull that provide an attachment at the desired height.

Each of the short range radar systems 14a–14c produce a conically shaped transmit and receive beam designated 16a–16c which may be electronically scanned. An exemplary short range radar system 14a–14c has transmit and receive beams with beam widths of approximately fifteen degrees and a scan range in azimuth of approximately one hundred fifty degrees. It will be recognized by one of ordinary skill in the art that other beam patterns, beam widths, and scan ranges are possible with this invention.

Each of the short range radar systems 14a–14c are coupled to an automated docking processor 18 via signal paths 20. The short range radar systems 14a–14c provide both range data and velocity data to the automated docking processor 18, where velocity data is the rate of closure between the dock and the ship. In one embodiment, the signal paths 20 are serial digital data that represent the range data and the velocity data. In a preferred embodiment, the short range radar systems 14a–14c provide range information that is accurate to less than plus or minus 1 foot and velocity data that is accurate to less that plus or minus 0.2 knots as the ship nears the dock. In an alternate embodiment, it will be recognized by one of ordinary skill in the art that the short range radar systems 14a–14c can provide only the range data, wherein the docking processor 18 can compute the velocity data.

In the exemplary auto-docking system 10, a plurality of, here four, trim tab secondary propulsion systems 22a–22d are moveably mounted to the ship 12 to help maneuver the ship 12 when approaching a location at which the ship 12 will dock. Although trim tab secondary propulsion systems are here shown, those of ordinary skill in the art will appreciate that other types of secondary propulsion systems including but not limited to bow and stem thrusters may also be used. As will be described below, the trim tab secondary propulsion systems 22a–22d can be moved into the water for docking or moved out of the water when the ship 12 is underway or docked. Electrical power to the four trim tab secondary propulsion assemblies 22a–22d is provided by electrical power cables 24a–24d and power switches 26a–26d. Power switches 26a–26d are coupled to the docking processor 18 via control line 28.

The docking processor 18 receives input range data and velocity data from the radar systems 14a–14c. The docking processor 18 can also receive data from conventional marine navigational systems 30a, 30b generally denoted 30. Marine navigational system 30a corresponds to a conventional water current indication system and marine navigational system 30b corresponds to a conventional wind speed indication system. Those of ordinary skill in the art should appreciate, however, that other types of marine navigational systems may also be used. The docking processor 18 receives data from each of the radars 14a–14c and some or all of the navigational systems 30 and computes ship position relative to the dock, and ship velocity relative to the dock, and provides data to a display 32. It should be recognized by one skilled in the art that any marine navigation system can be used to augment the display and the automatic docking process. For example, a marine speed log may be used to augment the system. Optionally, the short range radar systems 14a–14c can provide the only data.

By analyzing the radar data and optionally data from the navigation systems 30, the automated docking processor 18 is able to resolve the secondary propulsion system thrusts that are necessary to effect a safe docking of the ship 12 at a controlled approach rate to the dock.

It will be recognized by one of ordinary skill in the art that although the exemplary auto-docking system 10 is shown with three short range radar systems 14a–14c, other numbers of short range radar systems are possible. The particular number of short range radar systems 14 to use in any particular application is selected in accordance with a variety of factors including but not limited to the length and the size of the ship. Likewise, the position of each of the radar systems 14a–14c on a ship is selected in accordance with a variety of factors including but not limited to the length and the size of the ship 12, and the height of a dock to be detected by the auto-docking system 10.

It will further be recognized that although the exemplary auto-docking system 10 is shown with four trim tab secondary propulsions systems 22a–22d, other numbers of such assemblies are possible. The particular number of trim tab assemblies to use is selected in accordance with a variety of factors, including but not limited to the size and weight of the ship. Also, the particular type of secondary propulsion system to use in any particular application is selected in accordance with the same variety of factors, including but not limited to the size and weight of the ship.

Since the number and position of the radar systems 14a–14c is variable and determined by factors above, the auto-docking system 10 may require calibration so that the accurate position of the ship 12 relative to the dock will be provided to the display 32 and to the automated docking processor 18, thus allowing the docking processor 18 to effect a safe docking of the ship 12.

In one particular embodiment, the trim tabs 22a–22d of the secondary propulsion system are moveably mounted with a hinge to the hull of the ship 12. The trim tabs 22a–22d can be hinged upward or downward by a mechanism such as a rod and a power lift. The power lifts can be manually or automatically controlled. In the exemplary auto-docking system of FIG. 1, electric motors 34a–34d with propellers 36a–36d are mounted to the trim tabs 22a–22b. Power to the motors is applied with cables 24a–24d via power switches 26a–26d. The power switches 26a–26d are controlled by the docking processor 18 as discussed above, so as to provide either on/off or continuously variable electrical power to motors 34a–34d. It should be appreciated that in other embodiments, it may be desirable or necessary to use other means to control the secondary propulsion system via the docking processor 18. For example, it may be desirable to provide the trim tabs 22a–22d with an integrated means of up and down motion in which case docking processor 18 may be coupled directly to the trim tabs 22a–22d.

Figure 2:
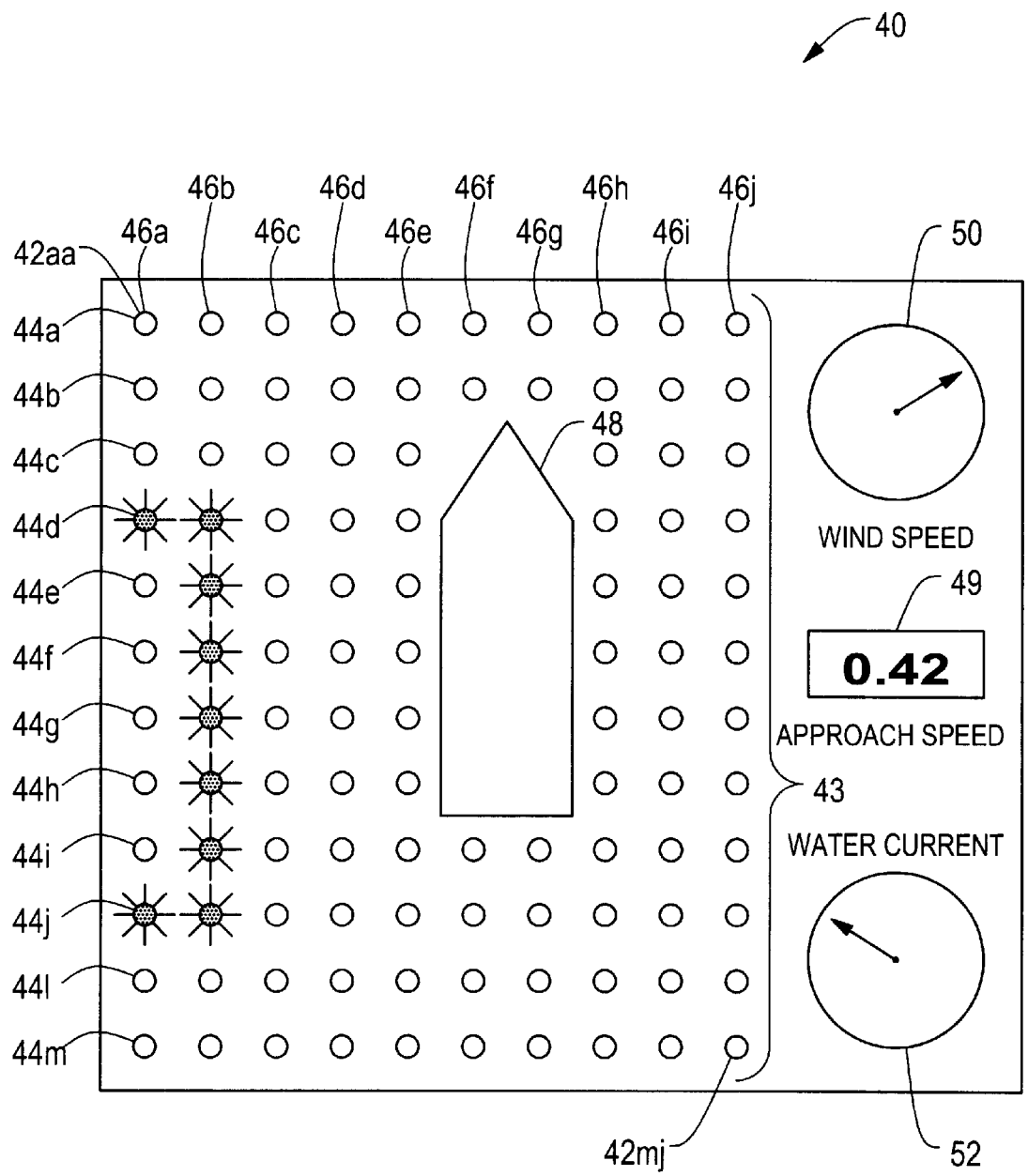
FIG. 2 is a diagram of a display for an auto-docking system.

Referring now to FIG. 2, a display 40, corresponding to display 32 (FIG. 1), includes a plurality of LED's 42 arranged in a grid pattern 43. Here the grid pattern 43 comprises twelve rows 44a–44m and ten columns 46a–46j. Each particular LED 42 is designated as 42xy where "x" corresponds to a row and "y" corresponds to a column. For example, LED 42aa corresponds to the LED disposed at the intersection of row 44a and column 46a while LED 42mj corresponds to the LED disposed at the intersection of row 44m and column 46j.

Disposed within the LED grid pattern 43 is an icon 48 which represents a ship on which the auto-docking system is displayed. The icon 48 may or may not be provided having a shape which is similar to the shape of the actual ship on which the system is disposed.

The docking processor 18 (FIG. 1) causes certain ones of the LEDs 42 to light to indicate the relative position between a dock and a ship upon which the auto-docking system is mounted. As shown in FIG. 2, for example, LEDs 42da, 42db, 42eb, 42fb, 42gb, 42hb, 42ib, 42jb and 42ja are lit to indicate the position of a dock relative to a position of a ship indicated by icon 48. As the distance between the actual ship and the actual dock decreases, LEDs 42eb, 42fb, 42gb, 42hb, and 42ib turn off and LEDs 42dc, 42ec, 42fc, 42gc, 42hc, 42ic and 42jc turn on thus providing a visual indication that the distance between the ship and the dock has decreased. This process is repeated until the LEDs in column 46e adjacent icon 48 are illuminated. It will be understood that in the case where the dock is on the opposite side of the vessel from that shown in FIG. 1, the process is repeated until the LEDs in column 46h are illuminated.

In an alternate embodiment, an icon can be used to represent the dock and a light pattern representing a ship can be illuminated. Thus, by illuminating different ones of the LED's 4d, the ship can appear to move closer to the dock icon.

The display 40 also includes an approach speed indicator 49 that represents the velocity data corresponding to the velocity of the ship relative to the dock provided by the short range radar systems 14a–14c, a wind speed indicator 50 and a water current indicator 52, corresponding to data provided by the wind speed indication system 30b (FIG. 1) and the water current indication system 30a (FIG. 1) respectively. It will be recognized by one of ordinary skill in the art that other forms of display are possible with this device, including, for example, CRT displays, liquid crystal displays (LCD), and chart displays. It will further be recognized that other marine navigational data may be displayed, for example, GPS information from a GPS system, Loran information from a Loran system, or ship speed information from a marine speed log. It should also be understood that in addition to or in place of a visual display, the system can also provide an audio display or even a mechanical indication of proximity of a ship to a dock.

In an alternate embodiment, a video display can be provided in place of the display 40 and having the grid pattern 43, the icon 48, the approach speed indicator 49, the wind speed indicator 50, and the water current indicator 52.

The auto-docking system of the present invention provides automatic control of a secondary propulsion system to more accurately and safely dock a ship. The auto-docking system utilizes conically shaped radar beams narrow in two dimensions that are electronically steered. The conical beams provide accurate close-in radar range data. With these characteristics, the auto-docking system of the present invention can dock a ship in difficult conditions, with wind and water current, without manual intervention. The likelihood of manual docking error and resulting damage are minimized.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A system for docking a ship, comprising:

a primary propulsion system coupled to the ship;

a secondary propulsion system coupled to the ship for automatic steering of the ship, said secondary propulsion system comprising:
a plurality of trim tabs mounted to the ship; and
a plurality of motors, each of said plurality of motors mounted to a corresponding one of said plurality of trim tabs, wherein each of said plurality of motors provides a principal direction of thrust at an angle to a keel of the ship;

a docking processor coupled to the secondary propulsion system to control thrust produced by the secondary propulsion system; and one or more radar systems coupled to the docking processor for providing navigational information to the docking processor.

2. The system of claim 1, wherein each of the motors in said secondary propulsion system corresponds to an electric motor.

3. The system of claim 1, wherein each of said plurality of trim tabs of said secondary propulsion system is movably mounted to the ship, each of said plurality of motors corresponds to an electric motor, each of the electric motors having a propeller, and each of the electric motors is mounted to a corresponding one of the one or more trim tabs, the system further including:

a power switch associated with each electric motor for controlling electrical power applied to the motor.

4. The system of claim 1, wherein the docking processor comprises:

a computer coupled to control the secondary propulsion system.

5. The system of claim 1, wherein the one or more radar systems comprise:

means, coupled to the ship, for providing one or more electrically steered antenna beams.

6. The system of claim 5, wherein each of the antenna beams is provided having a generally conical shape.

7. The system of claim 1, wherein the docking processor is further coupled to one or more marine navigation systems.

8. The system of claim 1, furthers comprising a display.

9. The system of claim 8, wherein the display comprises:
   a visual indication of a dock; and
   a visual indication of the position of the ship relative to the dock.

10. The system of claim 9, wherein the display further comprises:
    a visual indication of the velocity of closure between the ship and the dock.

11. The system of claim 10, wherein the display further comprises:
    a visual indication of navigational information from the one or more marine navigational systems.

12. The system of claim 9, further including a fixed visual indication of the ship.

13. The system of claim 10, wherein the visual indication of the velocity of closure comprises a numerical display showing a relative velocity.

* * * * *

UNITED STATES PATENT AND TRADEMARK OFFICE
CERTIFICATE OF CORRECTION

PATENT NO. : 6,677,889 B2
DATED : January 13, 2004
INVENTOR(S) : H. Barteld Van Rees et al.

It is certified that error appears in the above-identified patent and that said Letters Patent is hereby corrected as shown below:

Column 4,
Line 28, delete "Radar Transmitter Circuitry and Techniques," and replace with -- "Radar Transmitter Circuitry and Tecniques", --.
Lines 30-31, delete "Highly Integrated Single Substrate MMW Multi-Beam Sensor," and replace with -- Highly Integrated Single Substrate MMW Multi-Beam Sensor", --.
Line 35, delete "of course that" and replace with -- , of course, that --.

Column 5,
Line 64, delete "including but not limited to" and replace with -- including, but not limited to, --.

Column 6,
Lines 36, 39, 47 and 50-51, delete "including but not limited to" and replace with -- including, but not limited to, --.
Line 56, delete "relative to the dock" and replace with -- , relative to the dock, --.

Column 7,
Line 12, delete "LED's 42" and replace with -- LEDs 42 --.
Line 45, delete "LED's 4d" and replace with -- LEDs 4d --.

Column 9,
Line 3, delete "furthers" and replace with -- further --.

Signed and Sealed this

Tenth Day of August, 2004

JON W. DUDAS
*Acting Director of the United States Patent and Trademark Office*